US010082443B2

(12) United States Patent
Fuller et al.

(10) Patent No.: US 10,082,443 B2
(45) Date of Patent: Sep. 25, 2018

(54) SYSTEM AND METHOD FOR MONITORING BEARING HEALTH IN A JOURNAL ASSEMBLY

(71) Applicant: GENERAL ELECTRIC TECHNOLOGY GMBH, Baden (CH)

(72) Inventors: Mark Andrew Fuller, Canton, CT (US); Joseph David Bianca, Southampton, MA (US); Alexis Paige Decasse, Chicopee, MA (US); Kaz Chmlelowiec, Plainville, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 261 days.

(21) Appl. No.: 15/054,454

(22) Filed: Feb. 26, 2016

(65) Prior Publication Data
US 2017/0248493 A1 Aug. 31, 2017

(51) Int. Cl.
*G01P 3/68* (2006.01)
*G01P 3/48* (2006.01)
(Continued)

(52) U.S. Cl.
CPC .......... *G01M 13/045* (2013.01); *B02C 15/04* (2013.01); *G01P 3/443* (2013.01); *G01P 3/48* (2013.01);
(Continued)

(58) Field of Classification Search
CPC ...... G01M 13/045; B02C 15/04; G01P 3/443; G01P 3/48; F16C 2233/00; F16C 2320/23
(Continued)

(56) References Cited

U.S. PATENT DOCUMENTS 3,918,774 A * 11/1975 Nicholson ............. F16C 13/003
198/780
4,408,294 A * 10/1983 Imam ..................... G01H 1/006
702/35
(Continued)

FOREIGN PATENT DOCUMENTS

EP 0107178 A2 5/1984
EP 1302636 A1 4/2003
(Continued)

OTHER PUBLICATIONS

European Search Report and Opinion issued in connection with corresponding EP Application No. 17157499.9 dated Apr. 10, 2017.

*Primary Examiner* — J M Saint Surin
(74) *Attorney, Agent, or Firm* — GE Global Patent Operation; Stephen G. Midgley

(57) ABSTRACT

A system for monitoring the health of one or more bearings of a journal assembly is provided. The system includes a split spacer, one or more vibration sensors, a speed sensor, and a controller. The split spacer is configured to be disposed on a shaft of the journal assembly, the shaft is configured to support the bearings. The vibration sensors are configured to detect vibrations emitted by the bearings. The speed sensor is configured to measure the rotational speed of the bearings. The controller is configured to electronically communicate with the vibration sensors and the speed sensor and calculate a health status of the bearings. The split spacer includes two portions that define a cavity configured to abut the shaft so as to allow the vibration sensors to be disposed inside the split spacer and next to the one or more bearings.

25 Claims, 9 Drawing Sheets

(51) Int. Cl.
*B02C 15/04* (2006.01)
*G01M 13/04* (2006.01)
*G01P 3/44* (2006.01)

(52) U.S. Cl.
CPC ...... *F16C 2233/00* (2013.01); *F16C 2320/23* (2013.01)

(58) Field of Classification Search
USPC .......................................................... 73/593
See application file for complete search history.

(56) References Cited

U.S. PATENT DOCUMENTS

| | | | | |
|---|---|---|---|---|
| 4,751,657 A | * | 6/1988 | Imam | G01H 1/003 702/35 |
| 4,988,979 A | * | 1/1991 | Sasaki | G01H 3/12 340/683 |
| 5,258,923 A | * | 11/1993 | Imam | G01H 1/003 340/683 |
| 6,041,287 A | * | 3/2000 | Dister | B60L 3/0023 702/182 |
| 7,184,930 B2 | * | 2/2007 | Miyasaka | B61F 15/20 246/169 A |
| 7,394,395 B2 | * | 7/2008 | Sakatani | G01H 1/003 340/679 |
| 7,813,906 B2 | | 10/2010 | Shiromaru et al. | |
| 8,074,499 B2 | * | 12/2011 | Kinzie | G01H 1/003 73/112.01 |
| 8,087,172 B2 | | 1/2012 | Farris et al. | |
| 8,544,331 B2 | * | 10/2013 | Liang | G01N 29/14 73/659 |
| 9,097,575 B2 | * | 8/2015 | Gerez | G01H 1/006 |
| 9,103,741 B2 | * | 8/2015 | Baik | G01M 5/0016 |
| 9,739,167 B2 | * | 8/2017 | Heinig | F01D 21/003 |
| 2009/0036885 A1 | | 2/2009 | Gregg | |
| 2010/0280772 A1 | | 11/2010 | Saarinen et al. | |
| 2010/0327094 A1 | * | 12/2010 | Stone | B02C 15/04 241/33 |
| 2014/0123760 A1 | | 5/2014 | Klos et al. | |
| 2014/0151474 A1 | | 6/2014 | Stone | |
| 2014/0263772 A1 | | 9/2014 | Sutton et al. | |

FOREIGN PATENT DOCUMENTS

EP 2520809 A2 11/2012
WO 2011123014 A1 10/2011

* cited by examiner

SYSTEM AND METHOD FOR MONITORING BEARING HEALTH IN A JOURNAL ASSEMBLY

BACKGROUND

Technical Field

Embodiments of the invention relate generally to power generation, and, more specifically, to a system and method for monitoring the health of bearings in a journal assembly.

Discussion of Art

Pulverizer mills are devices that grind a solid fuel, such as coal, prior to combustion of the fuel in a boiler of a power plant. Many such mills grind solid fuels via grinding rollers that crush the fuels against a hard rotating concave surface known as a "bowl." The grinding rollers are attached to journal assemblies via bearings, which allow the grinding rollers to rotate. The journal assemblies also apply a downward force to the grinding rollers. When a solid fuel is placed into the bowl, the rotation of the bowl causes the solid fuel to move under the grinding rollers, which in turn causes the grinding rollers to rotate in place. Due to the downward force applied by the journal assemblies, the solid fuel is crushed/pulverized by the grinding rollers.

Over time, the bearings of the journal assemblies may potentially malfunction or fail due to sustained damage and/or normal wear. Failure of a bearing may prevent the attached grinding roller from rotating, which in turn may prevent the grinding roller from pulverizing a solid fuel contained by the bowl. As will be appreciated, the failure of a grinding roller to pulverize a solid fuel may reduce the efficiency of a power plant, or cause the power plant to cease operating.

To prevent or mitigate the effects of a bearing failure, the health of bearings in the journal assemblies of a pulverizer mill is periodically assessed so that damaged or worn bearings may be replaced prior to failure. Assessing bearing health is accomplished by manual inspection. Manually inspecting bearings, however, is a time consuming and labor intensive process. Moreover, large time periods may exist between manual inspections and, as a result, there is a risk that bearings may fail during the time between such inspections.

What is needed, therefore, is a system and method for monitoring the health of bearings in a journal assembly.

BRIEF DESCRIPTION

In an embodiment, a system for monitoring the health of one or more bearings of a journal assembly is provided. The system includes a split spacer, one or more vibration sensors, a speed sensor, and a controller. The split spacer is configured to be disposed on a shaft of the journal assembly. The shaft is configured to support the one or more bearings. The one or more vibration sensors are configured to detect vibrations emitted by the one or more bearings. The speed sensor is configured to measure the rotational speed of the one or more bearings. The controller is configured to electronically communicate with the one or more vibration sensors and the speed sensor and calculate a health status of the one or more bearings. The split spacer includes two portions that define a cavity configured to abut the shaft so as to allow the one or more vibration sensors to be disposed inside the split spacer and next to the one or more bearings.

In another embodiment, a journal assembly for a pulverizer mill, is provided. The journal assembly includes a rotatable housing, a shaft, a split spacer, one or more vibration sensors, and a speed sensor. The rotatable housing is coupled to a grinding roller. The shaft rotatably supports the rotatable housing via one or more bearings. The split spacer is disposed on the shaft. The one or more vibration sensors are configured to detect vibrations emitted by the one or more bearings and to electronically communicate with a controller. The speed sensor is configured to measure the rotational speed of the one or more bearings and to electronically communicate with the controller. The split spacer includes two portions that define a cavity configured to abut the shaft so as to allow the one or more vibration sensors to be disposed inside the split spacer and next to the one or more bearings.

In yet another embodiment, a solid fuel pulverizer mill is provided. The solid fuel pulverizer mill includes at least one journal assembly, a split spacer, one or more vibration sensors, a speed sensor, and a controller. The at least one journal assembly includes a shaft that rotatably supports, via one or more bearings, a rotatable housing coupled to a grinding roller configured to grind the solid fuel. The split spacer is disposed on the shaft. The one or more vibration sensors are configured to detect vibrations emitted by the one or more bearings. The speed sensor is configured to measure the rotational speed of the one or more bearings. The controller is configured to electronically communicate with the one or more vibration sensors and the speed sensor and calculate a health status of the one or more bearings. The split spacer includes two portions that define a cavity configured to abut the shaft so as to allow the one or more vibration sensors to be disposed inside the split spacer and next to the one or more bearings.

In yet still another embodiment, a split spacer for a journal assembly is provided. The split spacer includes a first portion, and a second portion configured to mate with the first portion. At least one of the first portion and the second portion includes one or more fasteners, such that when the split spacer is disposed on a shaft of the journal assembly and the first portion is mated to the second portion, the split spacer forms a cavity configured to abut the shaft so as to allow one or more vibration sensors to be fastened, via the one or more fasteners, inside of the cavity and next to the one or more bearings.

In yet still another embodiment, a method for monitoring the health of one or more bearings of a journal assembly is provided. The method includes detecting, via one or more vibration sensors in communication with a controller, vibrations emitted by the one or more bearings. The method further includes measuring, via a speed sensor in electronic communication with the controller, the rotational speed of the one or more bearings. The method further includes calculating, via the controller, a health status of the one or more bearings. A split spacer is disposed on a shaft that supports the one or more bearings and includes two portions that define a cavity that abuts the shaft such that the one or more vibration sensors are disposed inside the split spacer and next to the one or more bearings.

DRAWINGS

The present invention will be better understood from reading the following description of non-limiting embodiments, with reference to the attached drawings, wherein below:

DETAILED DESCRIPTION

Figure 1:
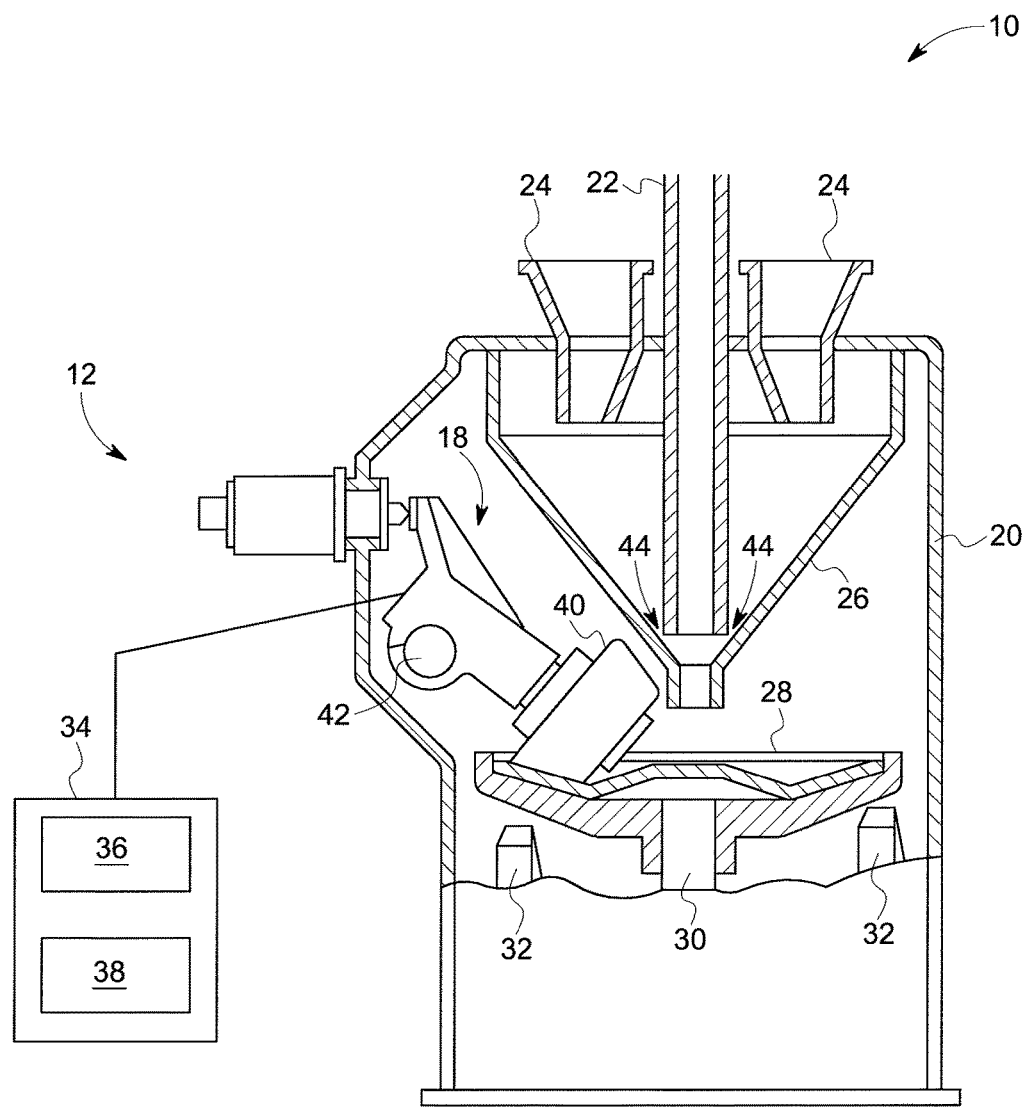
FIG. 1 is a diagram of a pulverizer mill that utilizes a system for monitoring the health of one or more bearings of a journal assembly in accordance with embodiments of the invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. As further used herein, the term "fill" includes both fully and partially filling a containing object with a filling object. Additionally, the term "health," as used herein with respect to the term "bearing," refers to the mechanical and/or tribological condition(s) of a bearing.

Further, while the embodiments disclosed herein are described with respect to bearings in the journal assemblies of a pulverizer mill, it is to be understood that embodiments of the present invention are equally applicable to any device and/or process in which the health of a bearing requires monitoring.

Accordingly, referring to FIG. 1, a pulverizer mill 10 that utilizes a system 12 for monitoring the health of one or more bearings (14, 16 in FIGS. 2, 3, and 6) of a journal assembly 18 in accordance with embodiments of the invention is shown. The pulverizer mill 10 includes a housing 20, a fuel inlet duct 22, one or more fuel outlet ducts 24, a separator/classifier 26, a rotating bowl 28 supported by a shaft 30 turned by a motor (not shown), one or more air inlet ducts 32, the journal assembly 18, and a controller 34 that includes at least one processor/CPU 36 and a memory device 38 that stores a monitoring application. The housing 20 contains the classifier 26, bowl 28, and the journal assembly 18. The fuel inlet duct 22, the fuel outlet ducts 24, and the air inlet ducts 32 penetrate the housing 20 as shown in FIG. 1. The journal assembly 18 is mounted to the interior of the housing 20 and includes a grinding roller 40 that is configured to grind a solid fuel against the rotating bowl 28.

In embodiments, a solid fuel is deposited into the rotating bowl 28 via the fuel inlet duct 22. As the bowl 28 rotates, the solid fuel is forced under the grinding roller 40 such that a biasing force provided by a biasing component 42 of the journal assembly 18 enables the grinding roller 40 to crush/pulverize the solid fuel. The air inlet ducts 32 blow forced air up through the housing 20 such that pulverized fuel is forced through gaps 44 in the classifier 26 and out the fuel outlet ducts 24. As is to be appreciated, the gap 44 only allows pulverized fuel of an appropriate size to pass through to the fuel outlet ducts 24 which may be in turn be fluidly connected to a combustion chamber of a boiler for a power plant and/or other fuel consuming device.

Figure 2:
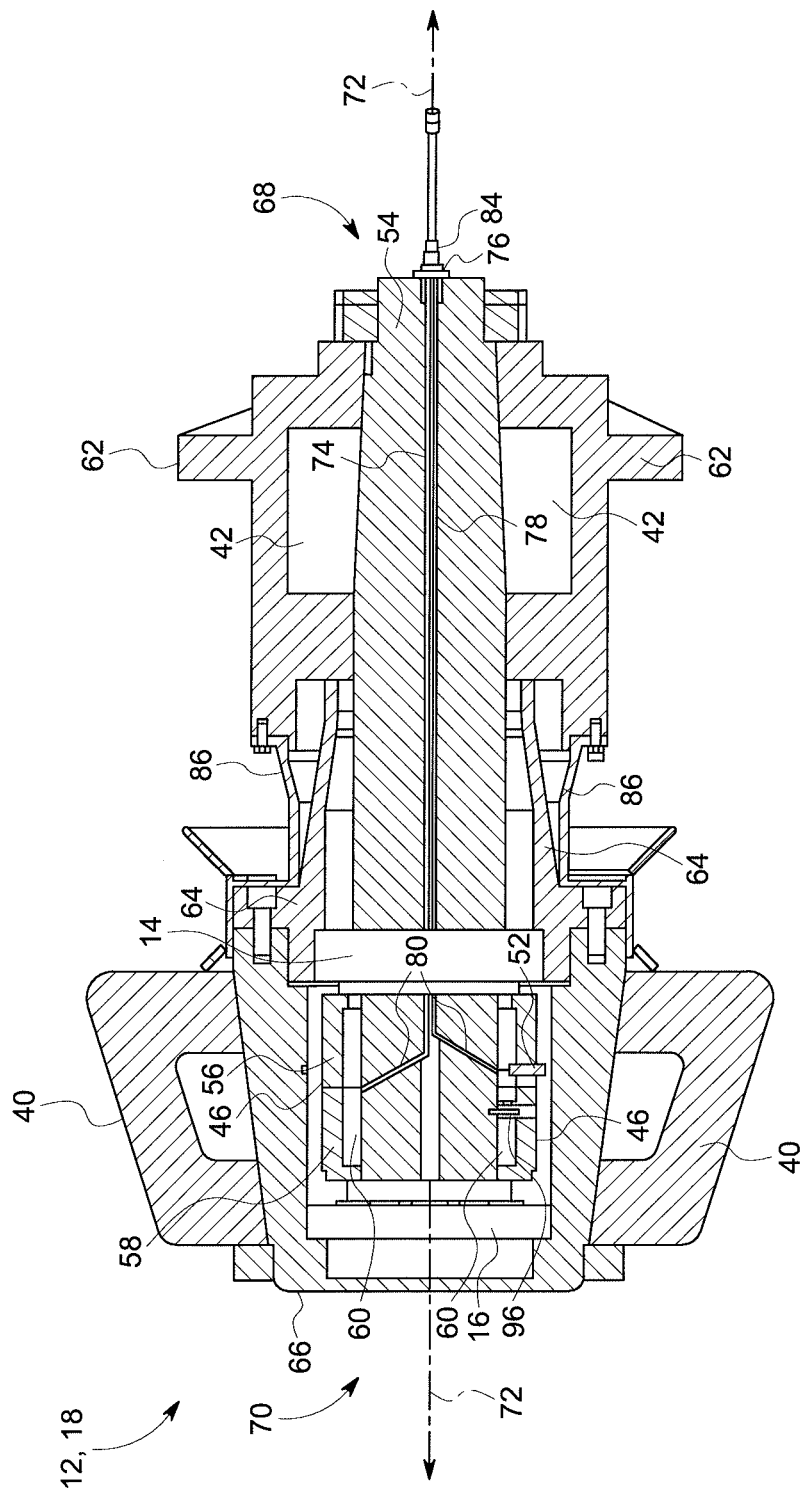
FIG. 2 is a cross-sectional view of a journal assembly according to an embodiment of the present invention.
Figure 3:
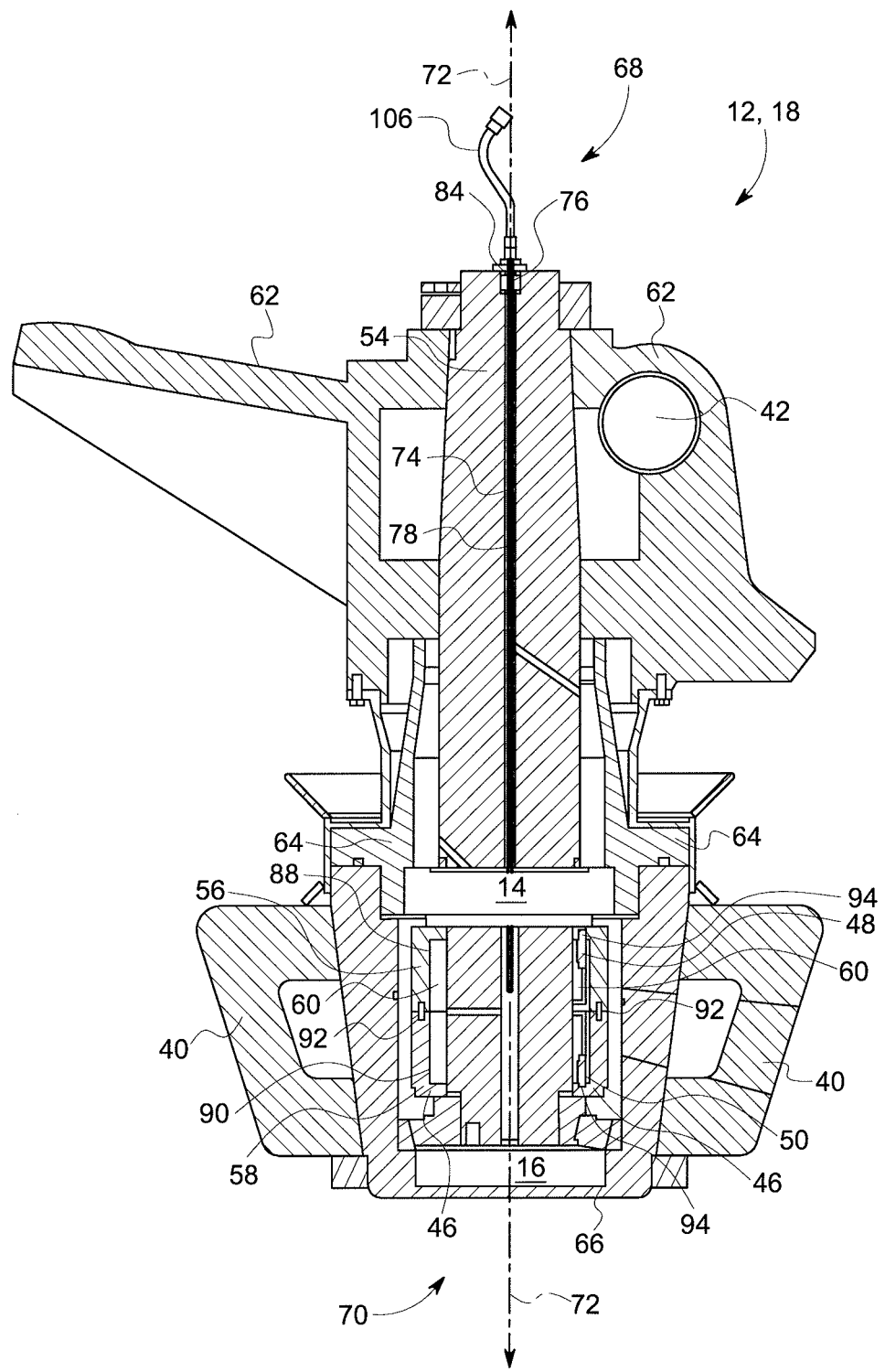
FIG. 3 is another cross-sectional view of the journal assembly of FIG. 2.

Turning now to FIGS. 2 and 3, two cross-sectional views of the journal assembly 18 of the system 12 are shown. As can be seen in FIGS. 2 and 3, the system 12 includes a split spacer 46, one or more vibration sensors 48, 50 (shown in FIG. 3), a speed sensor 52 (shown in FIGS. 2 and 4), and the controller (34 in FIG. 1). The split spacer 46 is configured to be disposed on a shaft 54 of the journal assembly 18. The shaft 54 is configured to support the bearings 14, 16. The vibration sensors 48, 50 are configured to detect vibrations emitted by the bearings 14, 16. The speed sensor 52 is configured to measure the rotational speed of the bearings 14, 16. The controller 34 is configured to electronically communicate with the vibration sensors 48, 50 and the speed sensor 52 and calculate a health status of the bearings 14, 16. In embodiments, the controller 34 may calculate the health status via the detected vibrations and the measured rotational speed of the bearings 14, 16. The split spacer 46 includes two portions 56 and 58 that define a cavity 60 configured to abut the shaft 54 so as to allow the vibration sensors 48, 50 to be disposed inside the split spacer 46 and next to the bearing 14, 16. In embodiments, the health status indicates the health of one or more of the bearings 14, 16, e.g., the health status may indicate the current status of the bearings 14, 16, whether or not the bearings 14, 16 need to be replaced, and/or how long until the bearings 14, 16 need to be replaced. In embodiments, the health status may be displayed on a video screen, used to trigger an alarm, and/or used to regulate operation of the pulverizer mill 10, e.g., slow the speed of the rotating bowl 28 and/or take a journal assembly 18 with a bearing having a poor health status (at or near failure) out of operation.

As further shown in FIGS. 2 and 3, the journal assembly 18 includes one or more stationary components 54, 62, 46, 48, 50, 52 and one or more rotating components 40, 64, 66. In embodiments, the stationary components may include the shaft 54, a journal head 62 disposed on the shaft 54, the split spacer 46, the vibration sensors 48, 50, and the speed sensor 52; and the rotating components may include an upper journal housing 64, a lower journal housing 66, and the grinding roller 40. The rotating components 40, 64, 66 are rotatably supported/connected to the shaft 54 via the bearings 14, 16.

The shaft 54 may have a first 68 end opposite a second end 70 disposed along a longitudinal axis 72 of the shaft 54. The shaft 54 is configured to support the one or more bearings 14, 16, e.g., the inner raceways of the bearings 14, 16 may be fitted to the shaft 54. In embodiments, the shaft 54 may include a central conduit 74, disposed along the longitudinal axis 72, that includes an opening 76 at the first end 68 of the shaft 54. The central conduit 74 may be configured to contain cables 78 that electronically connect the vibration sensors 48, 50 and the speed sensor 52 to the controller (34 in FIG. 1) and/or a power source (not shown) that powers the sensors 48, 50, 52.

Figure 5:
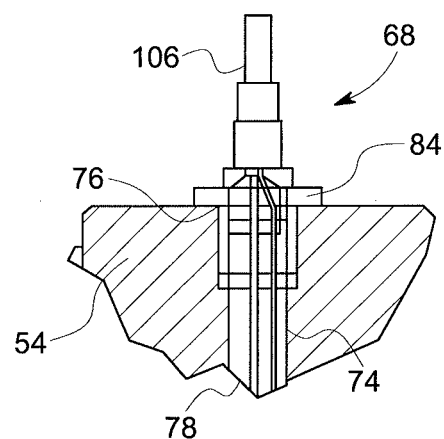
FIG. 5 is an enlarged view of an opening of a central conduit of the journal assembly of FIG. 2.

In embodiments, the shaft 54 may further include one or more passageways 80 (best seen in FIG. 2) that are configured to connect the central conduit 74 to the cavity 60 and to contain the cables 78. The passageways 80 may be disposed along a neutral axis (82 in FIG. 2), the neutral axis 82 being an axis of the shaft 54 that experiences the least amount of stress as the shaft 54 rotates about the longitudinal axis 72 while the grinding roller 40 crushes/pulverizes solid fuel. As is to be appreciated, locating the passageways 80 along the neutral axis 82 of the shaft 54 limits the degradation to the structural integrity of the shaft 54 resulting from incorporating, e.g., drilling/milling, the passageways 80 into the shaft 54. Additionally, the passageways 80 may be configured to intersect the central conduit 74 at an angle that corresponds to the flexibility of the cables 78, e.g., the passageways 80 may be configured to accommodate cables 78 that are unable to make right angle turns/bends. In embodiments, the shaft 54 may further include a plug 84 (best seen in FIG. 5) that seals the central conduit 74 while allowing the cables 78 to pass through. In such embodiments, the central conduit 74 may be further configured to contain a lubricant, e.g., oil.

Referring to FIG. 3, the journal head 62 is fastened to the shaft 54 at or near the first end 68 and contacts the biasing component 42. In embodiments, the biasing force provided by the biasing component 42 is applied, via the shaft 54, to the grinding roller 40 such that the grinding roller 40 resists movement in a direction opposite the biasing force. In other words, the biasing component 42 maintains a force on the grinding roller 40 so that the solid fuel must pass between it and the bowl 28 so as to cause the solid fuel to be ground/crushed/pulverized.

The upper journal housing 64 is disposed on the shaft 54 between the journal head 62 and the lower journal housing 66. In embodiments, the upper journal housing 64 may be rotatably supported to the shaft 54 via an upper journal bearing 14, e.g., the upper journal housing 64 is fitted to the outer race ring of the upper journal bearing 14. In embodiments, the upper journal housing 64 may be configured to mate with the journal head 62. In such embodiments, the journal head 62 may include a head skirt 86 that forms a seal with the upper journal housing 64 so as to inhibit dirt and other contaminates from contacting the mating portions of the journal head 62 and the upper journal housing 64.

The lower journal housing 66 is disposed on the shaft 54 at or near the second end 70 such that the lower journal housing 66 is on the opposite side of the upper journal housing 64 with respect to the journal head 62. In embodiments, the lower journal housing 66 may be rotatably supported/fitted to the shaft 54 by a lower journal bearing 16. In embodiments, and as shown in FIGS. 2 and 3, the upper 64 and lower 66 journal housings may be separate components fastened together such that they synchronously rotate about the shaft 54 via the upper 14 and lower 16 journal bearings. For example, in embodiments, the inner raceways of the upper 14 and lower 16 bearings may be fitted to the shaft 54, and the outer raceways of the upper 14 and lower 16 bearings may be fitted to the upper 64 and lower 66 journal housings, respectively. It is to be appreciated, however, that in other embodiments, the upper 64 and lower 66 journal housings may be formed from a single rotatable structure/housing.

The grinding roller 40 may be fastened/coupled to the lower journal housing 66 such that the grinding roller 40 is configured to rotate in place about the shaft 54. As is to be appreciated, and as stated above, the grinding roller 40 is configured to grind/pulverize a solid fuel, such as coal, in the bowl 28 prior to combustion of the solid fuel in a combustion chamber of a boiler and/or power plant.

As further shown in FIGS. 2 and 3, the split spacer 46 may be disposed on the shaft 54 between the upper 14 and lower 16 bearings. The two portions 56 and 58 of the split spacer 46 may each have a recessed surface 88 and 90, respectively. In embodiments, the two portions 56 and 58 may be fastened/mated together via one or more fasteners 92 (shown in FIG. 3). As is to be appreciated, in embodiments, the two portions 56 and 58 allow the vibration sensors 48 and 50 to be installed onto the shaft 54 such that the vibration sensors 48 and 50 are inside the split spacer 46, e.g., the vibration sensors 48 and 50 are disposed in the cavity 60 such that the vibration sensors 48 and 50 are disposed between the recessed surfaces 88 and 90 and the shaft 54. In particular, forming the split spacer 46 out of the two portions 56 and 58 provides for the ability to machine fasteners 94, e.g., threads, into the split spacer 46 such that the vibration sensors 48, 50 can be fastened/mounted inside of the cavity 60 prior to joining the two portions 56 and 58 together.

In embodiments, the vibration sensors 48, 50 may be shock pulse transducers. Accordingly, the vibration sensors 48, 50 may be configured/installed into the cavity 60 of the split spacer 46 such that they form a tight metal-to-metal connection with the slit spacer 46. Further, while the provided figures depict the vibration sensors 48, 50 as shock pulse transducers, it is to be understood that other types of vibration sensors may be used. Additionally, in embodiments, the number of vibration sensors 48, 50 may be greater than or equal to the number of bearings 14, 16. For example, in embodiments, each bearing 14, 16 may have a corresponding vibration sensor 48, 50.

Once the vibration sensors 48, 50 are mounted inside of the two portions 56 and 58, the portions 56 and 58 may be fastened together via fasteners 92. The split spacer 46 may then be installed onto the shaft 54. During installation of the split spacer 46 onto the shaft 54, the split spacer 46 may be rotated on the shaft so that the vibration sensors 48, 50 are aligned over or near the passageways 80. The cables 78 may then be routed through the passageways 80, central conduit 74, and out the opening 76 such that the cables 78 connect the vibration sensors 48, 50 to the controller 34. The split spacer 46 may then be configured to remain stationary in relation to the shaft 54, e.g., the split spacer 46 does not rotate about the shaft 54. For example, in embodiments, the split spacer 46 may be fastened to the shaft 54 via an anti-rotation pin 96 (shown in FIG. 2) which prevents the split spacer 46 from creeping and/or rotating about the shaft 54. In other words, the anti-rotation pin 96 prevents damage to the cables 78 by making the split spacer 46 a stationary component of the journal assembly 18. Additionally, a slot in the split spacer 46 parallel to the longitudinal axis 72 allows for easy alignment and installation of the anti-rotation pin 96 into the anti-rotation pin hole in the shaft 54.

Figure 4:
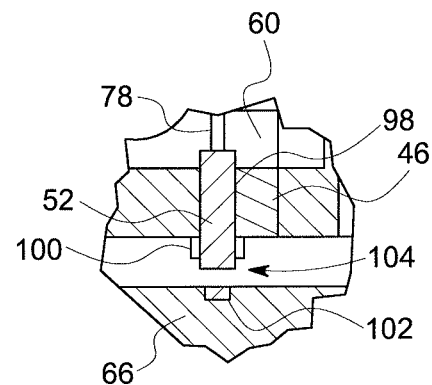
FIG. 4 is an enlarged view of a speed sensor of the journal assembly of FIG. 2.

Further, as shown in FIGS. 2 and 4, in embodiments, the split spacer 46 may be configured to secure the speed sensor 52 such that the speed sensor 52 measures the rotational speed of the one or more bearings 14, 16 by detecting the rotational speed of one or more of the rotating components 40, 64, 66. For example, the split spacer 46 may have a bore 98 into which the speed sensor 52 is installed. The speed sensor 52 may then be fastened in place via a fastener 100. Accordingly, in embodiments in which the split spacer 46 secures the speed sensor 52, the split spacer 46 may be further rotated about the longitudinal axis 72 of the shaft 54 such that the speed sensor 52 is aligned over or near a passage way 80 such that the cable(s) 78 connecting the speed sensor 52 to the controller 34 may be routed through the passageway 80, central conduit 74, and opening 76 in a manner similar to the cables 78 connecting the vibration sensors 48, 50 to the controller 34.

As is to be appreciated, in embodiments, the speed sensor 52 may be a Hall Effect sensor that detects the rotational frequency of two or more magnets 102 embedded in one or more of the rotating components 40, 64, 66. In embodiments including two or more magnets 102, the magnets 102 may be equally spaced around the circumference of the one or more rotating component 40, 64, 66 and ordered so as to have alternating polarities. For example, in such embodiments, four or more magnets 102 may be embedded in the lower journal housing 66 at equal distances from one another, and the split spacer 46 may secure the speed sensor 52 such that a gap 104 exists between the magnets 102 and the speed sensor 52. In embodiments, the gap 104 may be 0.375 inches.

Figure 6:
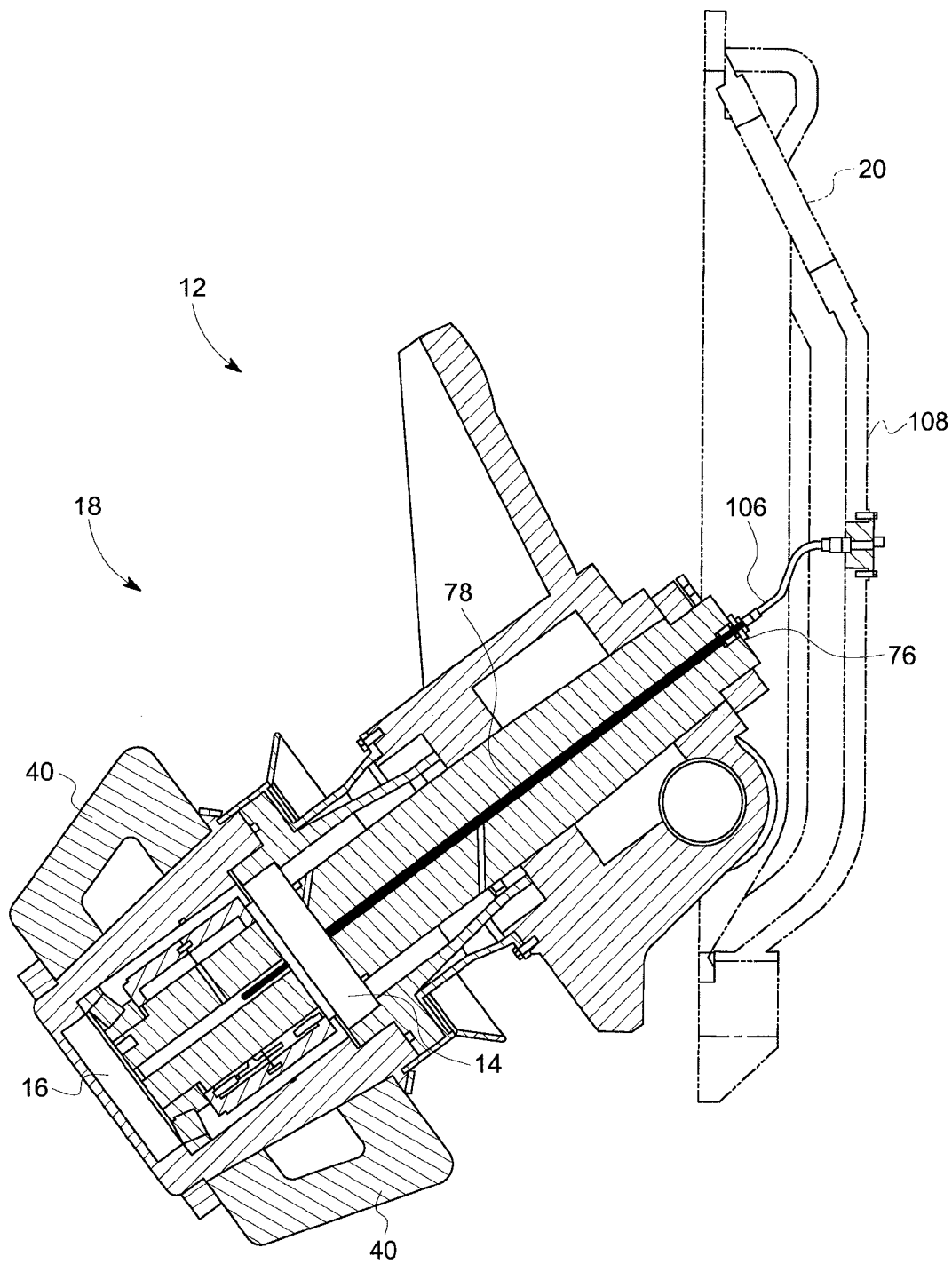
FIG. 6 is another cross-sectional view of the journal assembly of FIG. 2.
Figure 7:
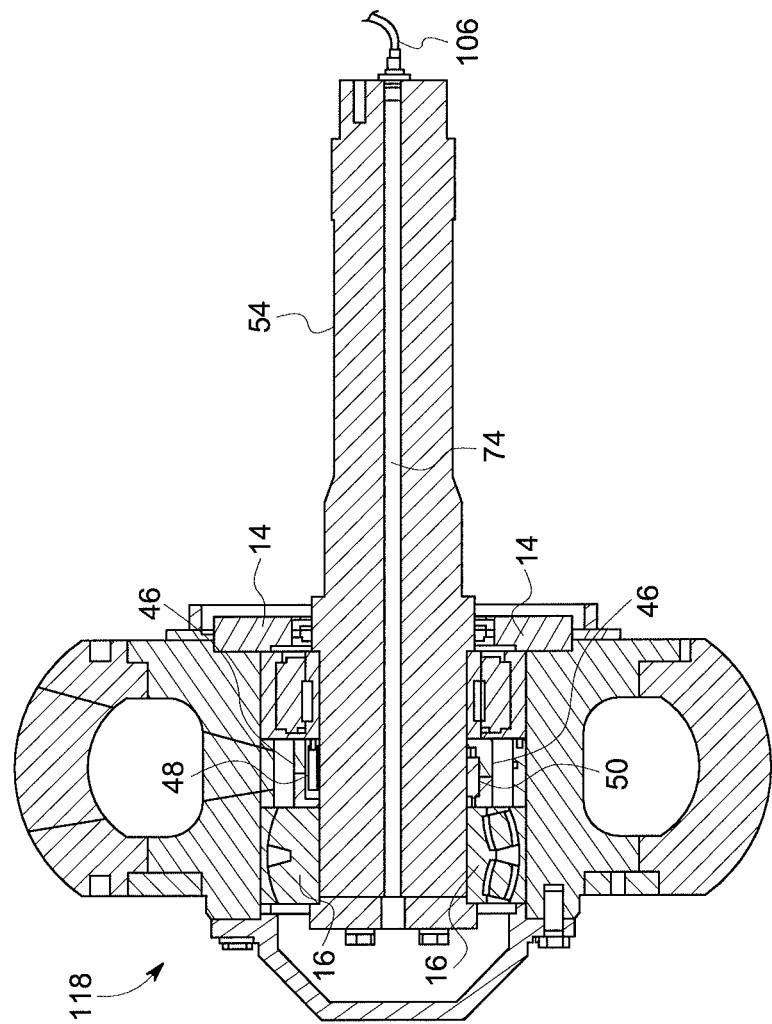
FIG. 7 is a cross-sectional view of a journal assembly in accordance with an additional embodiment of the present invention.
Figure 8:
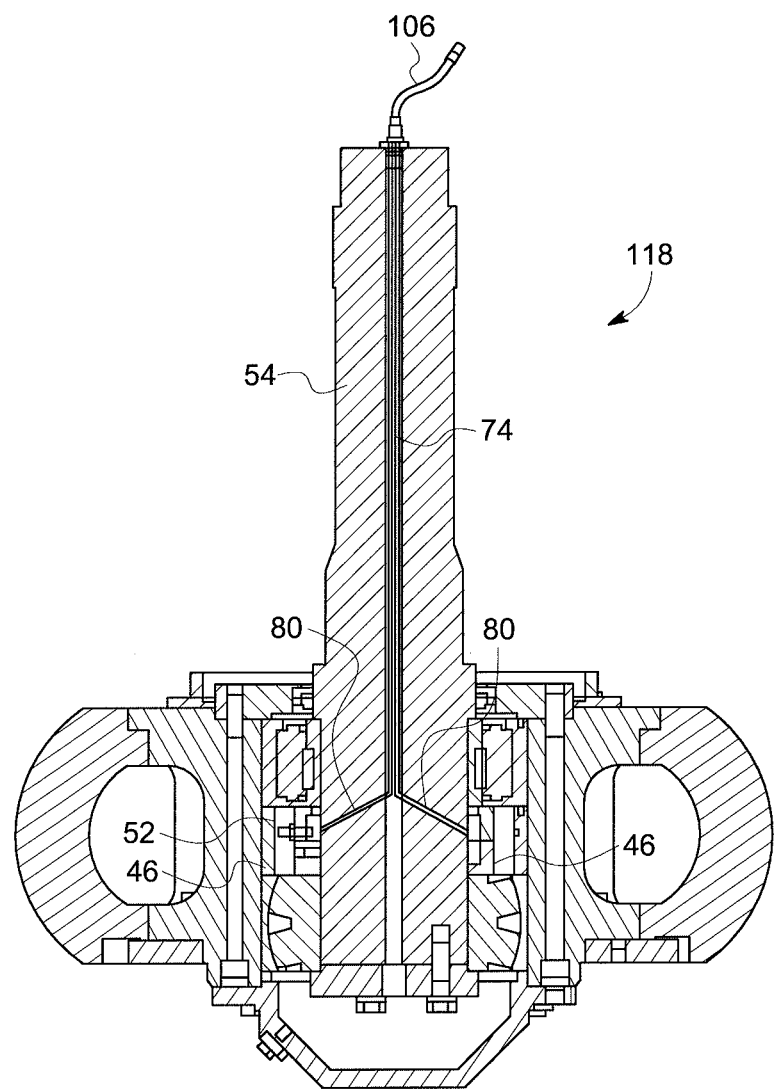
FIG. 8 is an additional cross-sectional view of the journal assembly of FIG. 7.
Figure 9:
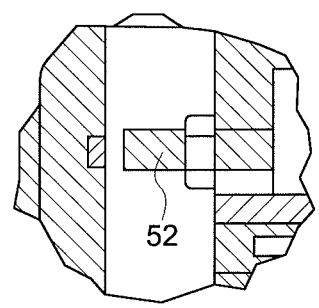
FIG. 9 is an enlarged view of a speed sensor of the journal assembly of FIG. 7.
Figure 10:
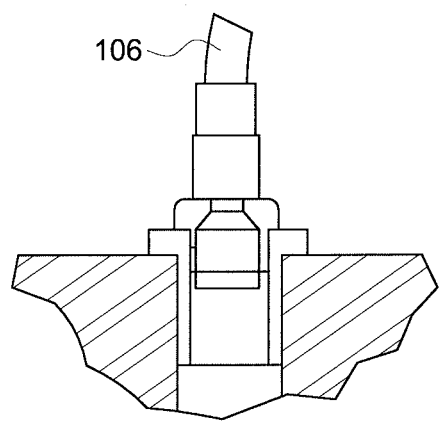
FIG. 10 is an enlarged view of an opening of a central conduit of the journal assembly of FIG. 7.

Turning now to FIG. 6, the system 12 may further include a hose 106 configured to contain and to protect a section of the cables 78 disposed between the opening 76 of the central conduit 74 and the housing 20 of the pulverizer mill 10. In embodiments, the hose 106 may penetrate a door 108 of the housing 20. The hose 106 may be environmentally sealed such that corrosive materials, e.g., pulverized fuel, cannot contact the cables 78. Additionally, the hose 106 may be flexible to accommodate the movement of the journal assembly 18 resulting from the grinding roller 40 crushing/pulverizing the solid fuel in the bowl 28.

As is to be appreciated, the journal assembly 18 may be assembled by forming the split spacer 46, vibration sensors 48, 50, speed sensor 52, cables 78 and fastener 100 into a subassembly. After routing the cables 78 through the slots in the split spacer 46, the subassembly may then be placed onto the shaft 54 such that the passageways 80 remain accessible. The cables 78 connecting the vibration sensors 48, 50 and the speed sensor 52 may then be routed through the shaft 54 via the passageways 80, central conduit 74, and opening 76 as discussed above. Once the cables 78 have been routed through the shaft 54, the subassembly may then be positioned on the shaft 54 such that the vibration sensors 48, 50 and the speed sensor 52 are over or near the passageways 80 though which their corresponding cables 78 pass. The subassembly may then be secured/fastened in place via lining up the anti-rotation slot in the split spacer 46 with the anti-rotation pin hole in the shaft 54 and fastening the split spacer 46 with the anti-rotation pin 96. The opening 76 may then be sealed via plug 84.

Additionally, as illustrated in FIGS. 7-10, alternative embodiments of the journal assembly 118 may not include a journal head (62 in FIG. 1), or an upper and lower journal housing (64 and 66, respectively, in FIG. 1). It is to be understood, however, that in such embodiments, the split spacer 46, vibration sensors 48, 50, speed sensor 52, central conduit 74, passageways 80, and hose 106, function in a manner similar to those discussed above.

Figure 11:
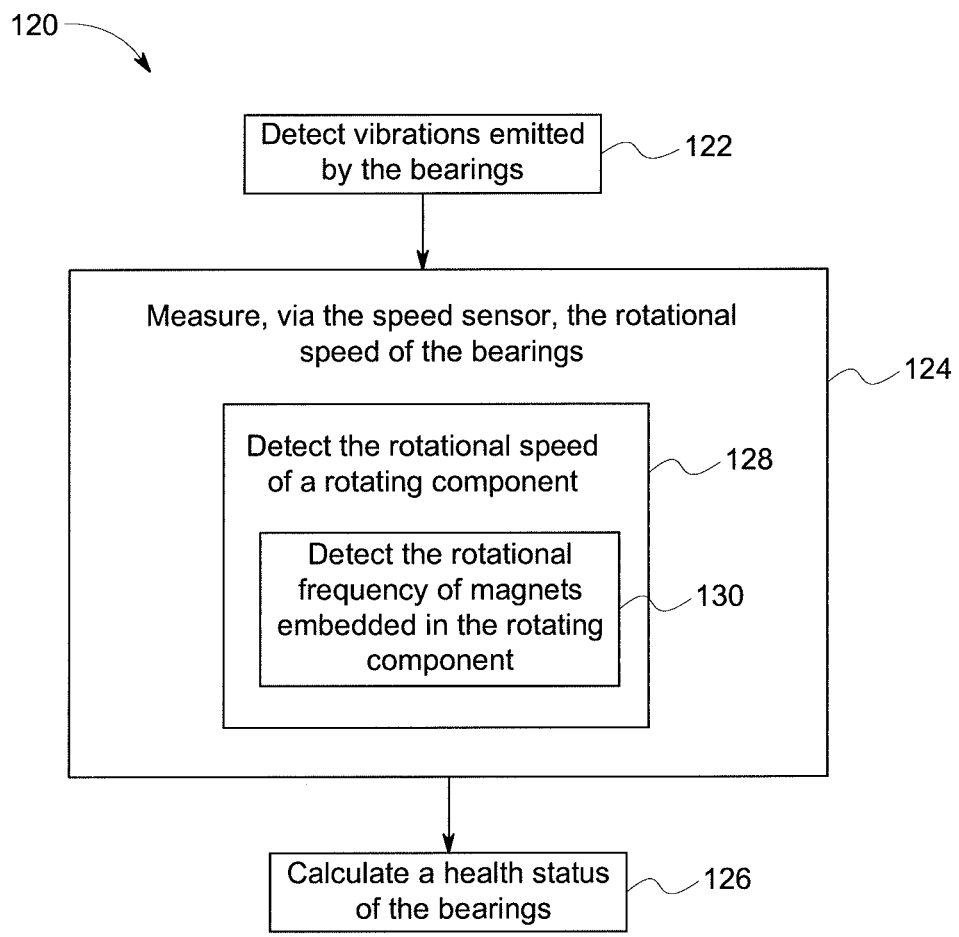
FIG. 11 is a flowchart depicting a method for monitoring the health of one or more bearings of a journal assembly according to an embodiment of the invention.

Turning now to FIG. 11, a method 120 for monitoring the health of one or more bearings 14, 16 of a journal assembly 18 that utilizes the system 12 is shown. As is to be appreciated, in embodiments, the monitoring application stored in the memory device 38 may be loaded into the at least one processor/CPU 36 such that the controller 34 is adapted by the monitoring application to perform all, or part, of method 120. The method includes: detecting 122, via the one or more vibration sensors 48, 50, vibrations emitted by the one or more bearings 14, 16; measuring 124, via the speed sensor 52, the rotational speed of the one or more bearings 14, 16; and calculating 126, via the controller 34, a health status of the one or more bearings 14, 16. In embodiments where the speed sensor 52 is secured by the split spacer 46, measuring 124, via the speed sensor 52, the rotational speed of the one or more bearings 14, 16 may include detecting 128 the rotational speed of a rotating component 40, 64, 66 of the journal assembly 18. Further, in embodiments where the speed sensor 52 is a Hall Effect sensor, detecting the rotational speed of the rotating component 40, 64, 66 of the journal assembly 18 may include detecting 130 the rotational frequency of two or more magnets 102 embedded in the rotating component 40, 64, 66.

As is to be understood, the vibrations emitted by the one or more bearings 14, 16 may be vibrational shocks generated between the loaded rolling elements and raceways of the one or more bearings 14, 16 which "ring" the vibration sensors 48, 50. Accordingly, in embodiments, the vibration sensors 48, 50 may be configured to convert the received rings into electrical signals, which are then transmitted via the cables 78 to the controller 34. In turn, the controller 34 may be configured to determine/calculate the health status of the bearings 14, 16 by analyzing the received electrical signals. The received signals may then be compared to predetermined values representative of various levels of health. For example, in certain embodiments, the electrical signals transmitted by the vibrational sensors 48, 50 may consist of pulses, and the controller 34 may determine the health status of the bearings 14, 16 based on the rate of received pulses. In such embodiments, the higher the rate of the received pulses, the worse the health of the bearings 14, 16. While the electrical signals transmitted by the vibration sensors 48, 50 are described herein as pulses, it is to be appreciated that other types of signals may be utilized, e.g., analogue or digital encoding, and/or other suitable signaling patterns. In embodiments, peaks, spikes or other variations, or patterns thereof, in the received signals can be utilized to determine health status.

As is to be further understood, the system 12 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 12 may include at least one processor 36, and system memory 38, which may include random access memory (RAM) and read-only memory (ROM). The system 12 may further include an input/output controller, and one or more data storage structures. All of these latter elements may be in communication with the at least one processor 36 to facilitate the operation of the system 12 as discussed above. Suitable computer program code may be provided for executing numerous functions, including those discussed above in connection with the system 12 and method 120 disclosed herein. The computer program code may also include program elements such as an operating system, a database management system and "device drivers" that allow the system 12, to interface with computer peripheral devices, e.g., sensors, a video display, a keyboard, a computer mouse, etc.

The at least one processor 36 of the system 12 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 12 and/or one or more programs, e.g., computer program code such as the monitoring application and/or other computer program product, adapted to direct the system 12. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 36 of the system 12 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for monitoring the health of one or more bearings of a journal assembly is provided. The system includes a split spacer, one or more vibration sensors, a speed sensor, and a controller. The split spacer is configured to be disposed on a shaft of the journal assembly. The shaft is configured to support the one or more bearings. The one or more vibration sensors are configured to detect vibrations emitted by the one or more bearings. The speed sensor is configured to measure the rotational speed of the one or more bearings. The controller is configured to electronically communicate with the one or more vibration sensors and the speed sensor and calculate a health status of the one or more bearings. The split spacer includes two portions that define a cavity configured to abut the shaft so as to allow the one or more vibration sensors to be disposed inside the split spacer and next to the one or more bearings. In certain embodiments, the split spacer is configured to remain stationary in relation to the shaft and to secure the speed sensor such that the speed sensor measures the rotational speed of the one or more bearings by detecting the rotational speed of a rotating component, of the journal assembly, rotatably supported by the one or more bearings. In certain embodiments, the speed sensor is a Hall Effect sensor that detects the rotational frequency of two or more magnets embedded in the rotating component. In certain embodiments, the shaft includes a central conduit and one or more passageways. The central conduit is disposed along a longitudinal axis of the shaft and includes an opening disposed at an end of the shaft. The one or more passageways are configured to connect the central conduit to the cavity. The central conduit and the one or more passageways are configured to contain cables that electronically connect the one or more vibration sensors and the speed sensor to at least one of the controller and a power source. In certain embodiments, the one or more passageways are disposed along a neutral axis of the shaft. In certain embodiments, the system further comprises a flexible hose configured to contain and to protect a section of the cables disposed between the opening of the central conduit and a housing of a pulverizer mill configured to contain the journal assembly. In certain embodiments, the one or more vibration sensors are shock pulse transducers. In certain embodiments, the number of vibration sensors of the one or more vibration sensors is greater than or equal to the number of bearings of the one or more bearings.

Other embodiments provide for a journal assembly for a pulverizer mill. The journal assembly includes a rotatable housing, a shaft, a split spacer, one or more vibration sensors, and a speed sensor. The rotatable housing is coupled to a grinding roller. The shaft rotatably supports the rotatable housing via one or more bearings. The split spacer is disposed on the shaft. The one or more vibration sensors are configured to detect vibrations emitted by the one or more bearings and to electronically communicate with a controller. The speed sensor is configured to measure the rotational speed of the one or more bearings and to electronically communicate with the controller. The split spacer includes two portions that define a cavity configured to abut the shaft so as to allow the one or more vibration sensors to be disposed inside the split spacer and next to the one or more bearings. In certain embodiments, the split spacer is configured to remain stationary in relation to the shaft and to secure the speed sensor such that the speed sensor measures the rotational speed of the one or more bearings by detecting the rotational speed of the rotatable housing. In certain embodiments, the speed sensor is a Hall Effect sensor that detects the rotational frequency of two or more magnets embedded in the rotatable housing. In certain embodiments, the shaft includes a central conduit, and one or more passageways. The central conduit is disposed along a longitudinal axis of the shaft and includes an opening disposed at an end of the shaft. The one or more passageways connect the central conduit to the surface of the shaft. Both the central conduit and the one or more passageways are configured to contain cables that electronically connect the one or more vibration sensors and the speed sensor to at least one of the controller and a power source. In certain embodiments, the one or more passageways are disposed along a neutral axis of the shaft. In certain embodiments, the journal assembly further comprises a flexible hose configured to contain and to protect a section of the cables disposed between the opening of the central conduit and a housing of the pulverizer mill. In certain embodiments, the one or more vibration sensors are shock pulse transducers. In certain embodiments, the number of vibration sensors of the one or more vibration sensors is greater than or equal to the number of bearings of the one or more bearings.

Yet still other embodiments provide for a solid fuel pulverizer mill. The solid fuel pulverizer mill includes at least one journal assembly, a split spacer, one or more vibration sensors, a speed sensor, and a controller. The at least one journal assembly includes a shaft that rotatably supports, via one or more bearings, a rotatable housing coupled to a grinding roller configured to grind the solid fuel. The split spacer is disposed on the shaft. The one or more vibration sensors are configured to detect vibrations emitted by the one or more bearings. The speed sensor is configured to measure the rotational speed of the one or more bearings. The controller is configured to electronically communicate with the one or more vibration sensors and the speed sensor and calculate a health status of the one or more bearings. The split spacer includes two portions that define a cavity configured to abut the shaft so as to allow the one or more vibration sensors to be disposed inside the split spacer and next to the one or more bearings.

In certain embodiments, the speed sensor is a Hall Effect sensor and the split spacer is configured to remain stationary in relation to the shaft and to secure the Hall Effect sensor such that the Hall Effect sensor measures the rotational speed of the one or more bearings by detecting the rotational frequency of two or more magnets embedded in the rotatable housing.

In certain embodiments, the shaft includes a central conduit, and one or more passageways. The central conduit is disposed along a longitudinal axis of the shaft and includes an opening disposed at an end of the shaft. The one or more passageways are configured to connect the central conduit to the cavity. Both the central conduit and the one or more passageways are configured to contain cables that electronically connect the one or more vibration sensors and the speed sensor to at least one of the controller and a power source.

In certain embodiments, the number of vibration sensors of the one or more vibration sensors is greater than or equal to the number of bearings of the one or more bearings.

Yet still other embodiments provide for a split spacer for a journal assembly. The split spacer includes a first portion and a second portion configured to mate with the first portion. At least one of the first portion and the second portion includes one or more fasteners, such that when the split spacer is disposed on a shaft of the journal assembly and the first portion is mated to the second portion, the split spacer forms a cavity configured to abut the shaft so as to allow one or more vibration sensors to be fastened, via the one or more fasteners, inside of the cavity and next to the one or more bearings. In certain embodiments, the vibration sensors are shock pulse transducers. In certain embodiments, the split spacer is configured to remain stationary in relation to the shaft and to secure a speed sensor. In certain embodiments, the speed sensor is a Hall Effect sensor.

Yet still other embodiments provide for a method for monitoring the health of one or more bearings of a journal assembly. The method includes detecting, via one or more vibration sensors in communication with a controller, vibrations emitted by the one or more bearings. The method further includes measuring, via a speed sensor in electronic communication with the controller, the rotational speed of the one or more bearings. The method further includes calculating, via the controller, a health status of the one or more bearings. A split spacer is disposed on a shaft that supports the one or more bearings and includes two portions that define a cavity that abuts the shaft such that the one or more vibration sensors are disposed inside the split spacer and next to the one or more bearings. In certain embodiments, the split spacer is configured to remain stationary in relation to the shaft and to secure the speed sensor. In such embodiments, measuring, via the speed sensor in electronic communication with the controller, the rotational speed of the one or more bearings includes detecting the rotational speed of a rotating component of the journal assembly, the rotating component rotatably supported by the one or more bearings. In certain embodiments, the speed sensor is a Hall Effect sensor. In such embodiments, detecting the rotational speed of the rotating component of the journal assembly includes detecting the rotational frequency of two or more magnets embedded in the rotating component. In certain embodiments, the shaft includes a central conduit and one or more passageways. The central conduit is disposed along a longitudinal axis of the shaft and includes an opening disposed at an end of the shaft. The one or more passageways are configured to connect the central conduit to the cavity. Both the central conduit and the one or more passageways are configured to contain cables that electronically connect the one or more vibration sensors and the speed sensor to at least one of the controller and a power source. In certain embodiments, the number of vibration sensors of the one or more vibration sensors is greater than or equal to the number of bearings of the one or more bearings.

Accordingly, as is to be appreciated, some embodiments of the invention provide for the ability to remotely, continuously, and/or instantaneously monitor the health of bearings in the journal assemblies of a pulverizer mill, which in turn reduces the risk that a bearing will fail during the time between manual inspection. Further, some embodiments of the invention may reduce the number and/or frequency of manual inspections of the bearings. Further still, some embodiments may eliminate the need to manual inspect the bearings of a journal assembly. Moreover, some embodiments of the invention provide for the ability to incorporate vibration and speed sensors into a journal assembly without comprising the design and/or functionality of the journal assembly.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for monitoring the health of one or more bearings of a journal assembly, the system comprising:
   a split spacer configured to be disposed on a shaft of the journal assembly, the shaft configured to support the one or more bearings;
   one or more vibration sensors configured to detect vibrations emitted by the one or more bearings;
   a speed sensor configured to measure the rotational speed of the one or more bearings;
   a controller configured to electronically communicate with the one or more vibration sensors and the speed sensor and calculate a health status of the one or more bearings; and
   wherein the split spacer includes two portions that define a cavity configured to abut the shaft so as to allow the one or more vibration sensors to be disposed inside the split spacer and next to the one or more bearings.

2. The system of claim 1, wherein the split spacer is configured to remain stationary in relation to the shaft and to secure the speed sensor such that the speed sensor measures the rotational speed of the one or more bearings by detecting the rotational speed of a rotating component, of the journal assembly, rotatably supported by the one or more bearings.

3. The system of claim 2, wherein the speed sensor is a Hall Effect sensor that detects the rotational frequency of two or more magnets embedded in the rotating component.

4. The system of claim 2, wherein the shaft comprises:
   a central conduit, disposed along a longitudinal axis of the shaft, that includes an opening disposed at an end of the shaft;
   one or more passageways configured to connect the central conduit to the cavity; and
   both the central conduit and the one or more passageways are configured to contain cables that electronically connect the one or more vibration sensors and the speed sensor to at least one of the controller and a power source.

5. The system of claim 4, wherein the one or more passageways are disposed along a neutral axis of the shaft.

6. The system of claim 4, wherein the system further comprises a flexible hose configured to contain and to protect a section of the cables disposed between the opening of the central conduit and a housing of a pulverizer mill configured to contain the journal assembly.

7. The system of claim 1, wherein the one or more vibration sensors are shock pulse transducers.

8. The system of claim 1, wherein the number of vibration sensors of the one or more vibration sensors is greater than or equal to the number of bearings of the one or more bearings.

9. A journal assembly for a pulverizer mill, the journal assembly comprising:
   a rotatable housing coupled to a grinding roller;
   a shaft that rotatably supports the rotatable housing via one or more bearings;
   a split spacer disposed on the shaft;

one or more vibration sensors configured to detect vibrations emitted by the one or more bearings and to electronically communicate with a controller;

a speed sensor configured to measure the rotational speed of the one or more bearings and to electronically communicate with the controller, and wherein the split spacer includes two portions that define a cavity configured to abut the shaft so as to allow the one or more vibration sensors to be disposed inside the split spacer and next to the one or more bearings.

10. The journal assembly of claim 9, wherein the split spacer is configured to remain stationary in relation to the shaft and to secure the speed sensor such that the speed sensor measures the rotational speed of the one or more bearings by detecting the rotational speed of the rotatable housing.

11. The journal assembly of claim 10, wherein the speed sensor is a Hall Effect sensor that detects the rotational frequency of two or more magnets embedded in the rotatable housing.

12. The journal assembly of claim 10, wherein the shaft comprises:
a central conduit, disposed along a longitudinal axis of the shaft, that includes an opening disposed at an end of the shaft;
one or more passageways that connect the central conduit to the surface of the shaft; and
both the central conduit and the one or more passageways are configured to contain cables that electronically connect the one or more vibration sensors and the speed sensor to at least one of the controller and a power source.

13. The journal assembly of claim 12, wherein the one or more passageways are disposed along a neutral axis of the shaft.

14. The journal assembly of claim 12, wherein the journal assembly further comprises a flexible hose configured to contain and to protect a section of the cables disposed between the opening of the central conduit and a housing of the pulverizer mill.

15. The journal assembly of claim 9, wherein the one or more vibration sensors are shock pulse transducers.

16. The journal assembly of claim 9, wherein the number of vibration sensors of the one or more vibration sensors is greater than or equal to the number of bearings of the one or more bearings.

17. A split spacer for a journal assembly, the split spacer comprising:
a first portion; and
a second portion configured to mate with the first portion; and
wherein at least one of the first portion and the second portion includes one or more fasteners, such that when the split spacer is disposed on a shaft of the journal assembly and the first portion is mated to the second portion, the split spacer forms a cavity configured to abut the shaft so as to allow one or more vibration sensors to be fastened, via the one or more fasteners, inside of the cavity and next to the one or more bearings.

18. The split spacer of claim 17, wherein the vibration sensors are shock pulse transducers.

19. The split spacer of claim 17, wherein the split spacer is configured to remain stationary in relation to the shaft and to secure a speed sensor.

20. The split spacer of claim 19, wherein the speed sensor is a Hall Effect sensor.

21. A method for monitoring the health of one or more bearings of a journal assembly, the method comprising:
detecting, via one or more vibration sensors in communication with a controller, vibrations emitted by the one or more bearings,
measuring, via a speed sensor in electronic communication with the controller, the rotational speed of the one or more bearings;
calculating, via the controller, a health status of the one or more bearings; and
wherein a split spacer is disposed on a shaft that supports the one or more bearings and includes two portions that define a cavity that abuts the shaft such that the one or more vibration sensors are disposed inside the split spacer and next to the one or more bearings.

22. The method of claim 21, wherein the split spacer is configured to remain stationary in relation to the shaft and to secure the speed sensor, and measuring, via the speed sensor in electronic communication with the controller, the rotational speed of the one or more bearings comprises:
detecting the rotational speed of a rotating component of the journal assembly, the rotating component rotatably supported by the one or more bearings.

23. The method of claim 22, wherein the speed sensor is a Hall Effect sensor, and detecting the rotational speed of the rotating component of the journal assembly comprises:
detecting the rotational frequency of two or more magnets embedded in the rotating component.

24. The method of claim 21, wherein the shaft comprises:
a central conduit, disposed along a longitudinal axis of the shaft, that includes an opening disposed at an end of the shaft;
one or more passageways configured to connect the central conduit to the cavity; and
both the central conduit and the one or more passageways are configured to contain cables that electronically connect the one or more vibration sensors and the speed sensor to at least one of the controller and a power source.

25. The method of claim 21, wherein the number of vibration sensors of the one or more vibration sensors is greater than or equal to the number of bearings of the one or more bearings.

* * * * *